United States Patent [19]
Raffa et al.

[11] Patent Number: 5,382,942
[45] Date of Patent: Jan. 17, 1995

[54] ENGINE OIL MONITORING SYSTEM HAVING AN IN-VEHICLE DISPLAY OF THE CURRENT STATUS OF THE OIL

[75] Inventors: James M. Raffa, Rochester; Terry T. Cwik, Livonia; Michael F. Aronow, Southfield; Winston A. Little, Plymouth; Allen H. Meitzler, Ann Arbor; Peter W. Misangyi, Novi, all of Mich.; Jame A. Nix-Gomez, Bristol, England; George S. Saloka, Dearborn; Noel A. Walker, Birmingham, both of Mich.

[73] Assignee: Ford Motor Company, Dearborn, Mich.

[21] Appl. No.: 86,073

[22] Filed: Jul. 6, 1993

[51] Int. Cl.$^6$ .................................... F01M 11/10
[52] U.S. Cl. ........................ 340/457.4; 364/424.03; 340/438; 340/439
[58] Field of Search .............. 340/438, 439, 457.4, 340/4; 73/116; 364/550, 551.01, 424.03, 424.05

[56] References Cited

U.S. PATENT DOCUMENTS

| | | | |
|---|---|---|---|
| 4,675,662 | 6/1987 | Kondo et al. | 340/631 |
| 4,706,193 | 11/1987 | Imajo et al. | 364/424 |
| 4,733,556 | 3/1988 | Meitzler et al. | 73/64 |
| 4,742,476 | 5/1988 | Schwartz et al. | 364/550 |
| 4,796,204 | 1/1989 | Inoue | 364/550 |
| 4,845,623 | 7/1989 | Korb | 364/431.03 |
| 4,847,768 | 7/1989 | Schwartz et al. | 364/424.03 |
| 4,884,054 | 11/1989 | Moon, Sr. | 340/309.15 |
| 4,970,492 | 11/1990 | King | 340/450.3 |
| 5,060,156 | 10/1991 | Vajgart et al. | 364/424.03 |

OTHER PUBLICATIONS

"Development of the PV-2 Engine Deposit and Wear Test-An ASTM Task Force Progress Report", By W. Nahumck et al., SAE Technical Paper #872123, International Fuels and Lubricants Meeting and Exposition, Toronto, Ontario, Nov. 2-5, 1987, 27 pages.

Lubrizol Newsline, vol. 6, No. 1, Mar., 1988, Lubrizol Petroleum Chemicals Company, 6 pages.

"Field Testing: The Final Proof of Performance", By C. Colyer et al., SAE Paper #885018, Presented at the XXII FISTA Congress, Dearborn, Michigan, Sep. 25-29, 1988, 22 pages.

"A Capacitive Oil Deterioration Sensor", By G. Saloka et al., SAE Paper #910497, International Congress and Exposition, Detroit, Michigan, Feb. 25-Mar. 1, 1991, pp. 137-146.

Primary Examiner—James J. Groody
Assistant Examiner—Nathan J. Flynn
Attorney, Agent, or Firm—Roger L. May; Richard D. Dixon

[57] ABSTRACT

An oil monitoring system storing a remaining percent tachometer oil life, a remaining percent time oil life and a remaining percent odometer oil life. The oil monitoring system has means for selecting and displaying the lowest of these three remaining percent oil life values as the lowest remaining percent oil life. The selected lowest remaining percent oil life is compared to predetermined percentages to display on an in-vehicle display if the oil is OK, if the oil is to be changed soon, or if an oil change is required. The oil monitoring system may include an oil dielectric constant sensor and display if the oil is to be changed soon or an oil change is required as a function in the change in the oil's dielectric constant.

27 Claims, 10 Drawing Sheets

ENGINE OIL MONITORING SYSTEM HAVING AN IN-VEHICLE DISPLAY OF THE CURRENT STATUS OF THE OIL

TECHNICAL FIELD

The invention is related to the field of engine oil monitoring systems and, in particular, to an engine oil monitoring system which displays the oil status as a remaining percent of oil life.

BACKGROUND ART

The prior art teaches various methods and systems for determining when it is required to change the oil in the engine of an automotive vehicle. These systems normally include an in-vehicle display activated by the operator, which signifies the current status of the oil. Vajgart et al., in U.S. Pat. No. 5,060,156, discloses a system for determining oil change intervals as a function of the number of engine revolutions. The number of engine revolutions are weighted as a function of oil temperature. Imajo et al., in U.S. Pat. No. 4,706,193, discloses an oil degradation warning system in which the oil degradation is computed as an integrated function of oil temperature, distance driven and engine speed, while Inoue, in U.S. Pat. No. 4,796,204, discloses an oil degradation warning system which generates three different degradation coefficients. Each of these degradation coefficients are an integrated function of oil temperature, engine speed and engine load weighted differently. Inoue further teaches a warning to change oil is provided when any one of the three degradation coefficients exceeds an associated limit. Korb, in U.S. Pat. No. 4,845,623, discloses an oil change warning system in which the actual number of miles remaining before oil change is displayed. The distance being traveled is weighted by oil temperature and engine speed. Finally, Moon, Sr., in U.S. Pat. No. 4,884,054, teaches a self-contained system which issues a warning to change the oil as a function of time.

The prior art has taught that the monitoring of the status of the oil in the engine is considered to be of significant importance and that systems which monitor the oil status and provide warnings to the vehicle's operator when it is time to change oil will be available in all automotive vehicles in the near future.

SUMMARY OF THE INVENTION

The invention is an oil monitoring system for the engine of an automotive vehicle. The engine being of a conventional type having a rotary member and an oil sump. The oil monitoring system has means for generating tachometer pulse increments proportional to the number of revolutions of the engine's rotary member. Means are also provided for generating a weighting factor as a function of the temperature of the oil in the oil sump, and means for multiplying the generated weighting factor by a correction factor in response to the level of the oil in the oil sump to generate a corrected weighting factor.

A multiplier multiplies the tachometer pulse increments by the corrected weighting factor to generate weighted tachometer increments. A remaining percent tachometer oil life storage device stores a percent of the tachometer oil life remaining before an oil change is required. The remaining percent oil life is decremented by a first percentage each time the number of weighted tachometer increments reach a predetermined number.

A remaining percent time oil life storage device stores a percent of actual time remaining before an oil change is required. The remaining percent time oil life is decremented by a second percentage at predetermined time intervals.

A remaining percent odometer oil life storage device stores the percent of odometer oil life remaining before an oil change is required. Means are provided to detect when the vehicle is driven a predetermined distance to decrement the remaining percent odometer oil life by a third percentage.

A selection means selects the smallest of the remaining percent tachometer oil life, the time oil life and the odometer oil life and displays the percentage value of the selected smallest percent oil life. A first comparator means compares the smallest percent oil life with a preselected percentage value and displays the oil status as OK when the smallest percent oil life is greater than the preselected percentage value. A second comparator determines when the smallest percent oil life is less than the preselected percentage, but greater than zero to display a "CHANGE OIL SOON" oil status or display "OIL CHANGE REQUIRED" when the smallest percent oil life is zero.

When the engine is a multi-fuel engine equipped to operate with at least two different fuels, the system may include means for generating the weighting factor as a function of both the temperature of the oil and the type of fuel currently being used to run the engine.

The system may also include a sensor measuring the dielectric constant of the oil in the oil sump and means for displaying the status of the oil as OK when the change in the dielectric constant is less than a first percentage, for displaying the status of the oil as "CHANGE OIL SOON" when the dielectric constant of the oil has changed from its initial value by a percentage greater than the first percentage and less than a second percentage, and for displaying the status of the oil as "OIL CHANGE REQUIRED" when the change in the dielectric constant of the oil is greater than the second percentage.

One advantage of the oil monitoring system is that the status of the oil is maintained as a function of at least three different parameters which affect the status of the oil.

Another advantage is that the smallest of the remaining percent oil life as a function of the three different parameters is displayed and used to determine the oil status.

Another advantage of the oil monitoring system is that the vehicle operator may change the rate at which remaining percent of each of the three oil lives to more accurately reflect the operational mode of and the environment in which the vehicle is operated.

Still another advantage is that the oil monitoring system is adaptable to multi-fuel engines and the weighting factors are correctable to accommodate the specific type of fuel being used.

These and other advantages will become more apparent from a reading of the detailed description of the oil monitoring system in conjunction with the drawings.

DETAILED DESCRIPTION OF THE PREFERRED EMBODIMENT

Figure 1:
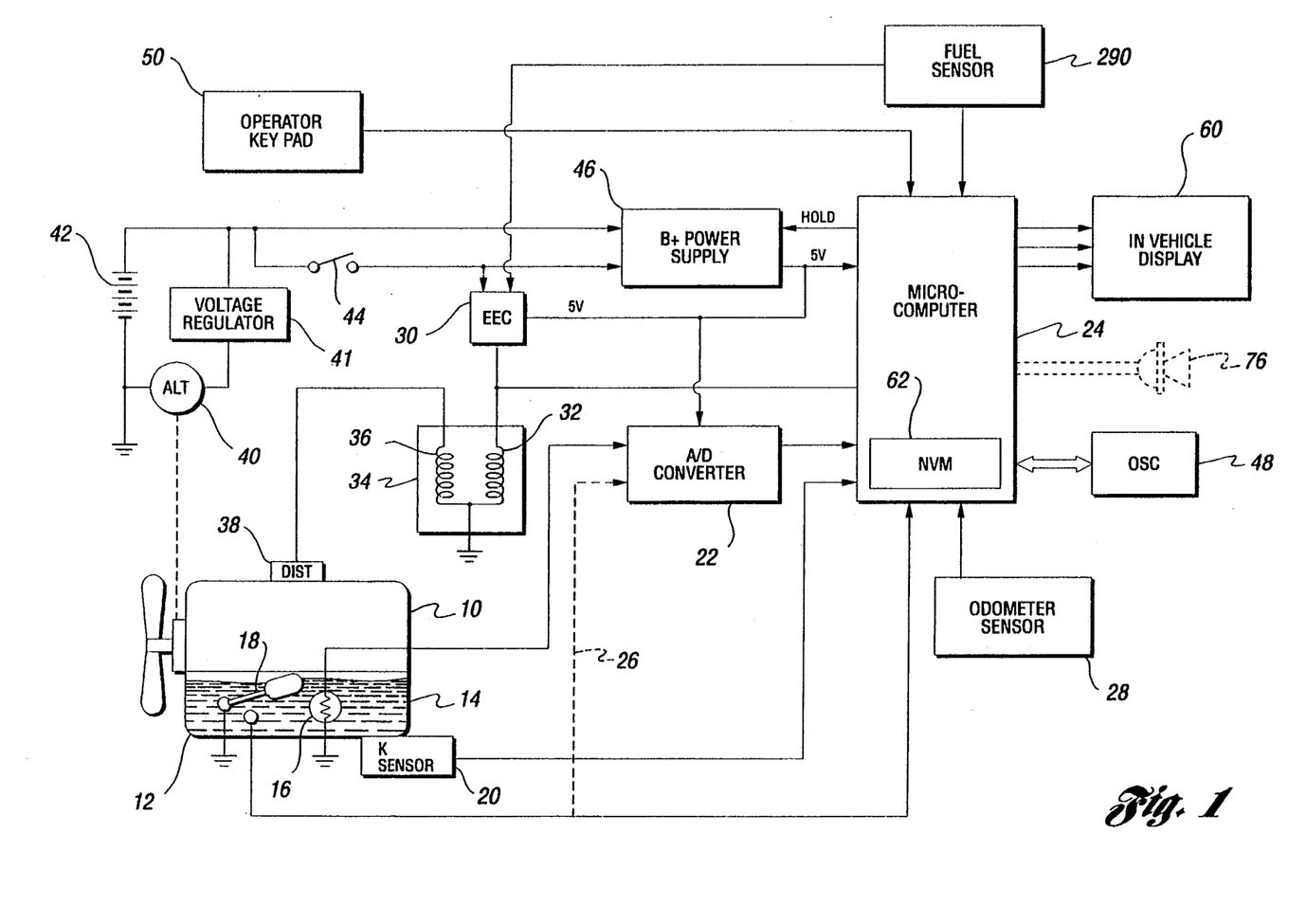
FIG. 1 is a block diagram showing the major components of the engine oil monitoring system.

In FIG. 1, an internal combustion engine 10 has an oil sump 12 which holds a supply of oil 14 which is used to lubricate the engine 10. An oil temperature sensor, such as thermistor 16, and an oil level sensor 18 are disposed inside the oil sump 12 and measure the temperature and level of the oil 14 in the oil sump 12, respectively. The oil level sensor 18 may be a simple float actuated switch, as illustrated, or may be a potentiometer generating an output signal having a value variable with the level of the oil. The engine 10 may also include an oil dielectric constant sensor (K sensor) 20, such as taught by Meitzler and Saloka in U.S. Pat. No. 4,733,556, which measures the dielectric constant of the oil when it reaches a predetermined temperature.

The output of the temperature sensor 16 is converted to a digital format by analog-to-digital converter 22 prior to being input to a microcomputer 24. In the preferred embodiment, the analog-to-digital converter is incorporated in the microcomputer 24 but may be a separate device as shown.

When the output of the oil level sensor 18 has a binary value, i.e. open or ground, as produced by a single throw, single pole switch, the generated binary value is communicated directly to the microcomputer 24. However, when the output of the oil level sensor 18 is an analog signal, the generated analog signal would be converted to a digital format by the analog-to-digital converter 22 as indicated by dashed line 26. The output of the dielectric constant sensor 20, when of the type taught by Meitzler and Saloka, is an oscillating signal having a frequency component corresponding to the dielectric constant of the oil. This oscillating signal may be directly communicated to the microcomputer 24. However, if the oil dielectric constant sensor 18 includes means for converting the frequency component of the oscillating signal to an analog signal, the generated analog signal will be converted to a digital format by the analog-to-digital converter 22 in the same manner as the analog outputs of the oil temperature and oil level sensors.

The microcomputer 24 also receives inputs from an odometer sensor 28 indicative of the actual distance driven by the vehicle and engine speed or tachometer signals generated by the electronic engine control (EEC) 30 indicative of the speed of revolution of the engine. The engine speed signals, as shown in FIG. 1, may be the ignition pulses generated by the electronic engine control 30 which are used to fire the spark plugs in the engine 10. These ignition pulses are received by the primary coil 32 of a high voltage transformer 34. The output of the secondary coil 36 is connected to an electric signal distributing device such as distributor 38 which distributes the high voltage pulses generated in the secondary coil 36 to the appropriate spark plug in a conventional manner.

The rotary output of the internal combustion engine 10 is connected to an alternator 40. The alternator 40 and its associated voltage regulator 41 provide electrical power to the vehicle at approximately 14 volts and charge the battery 42 when the engine 10 is running. The electrical circuit of the vehicle includes an ignition switch 44, which when placed in the "on" or "run" position, provides electrical power to a regulated voltage (Bt) power supply 46 from either the voltage regulator 41 or battery 42 in a conventional manner. The regulated voltage power supply 46 may be a regulated voltage power supply incorporated in the electronic engine control 24 or may be a discrete device independent of the electronic engine control 24 as shown. The regulated voltage power supply 46 produces a regulated 5V output which is used to power the analog-to-digital converter 22, the microcomputer 24 and the electronic engine control 30. The electronic engine control 30 may also receive unregulated electrical power from the voltage regulator 41 or battery 42 for the generation of higher voltage ignition pulses and other power output signals. The regulated voltage power supply 46 also receives the electrical power from either the voltage regulator or battery 42 which is regulated to produce a 5V potential to both the analog-to-digital converter 22 and the microcomputer 24 in response to a HOLD signal generated by the microcomputer 24.

Figure 2:
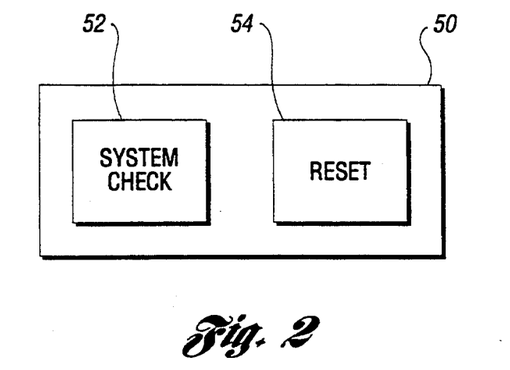
FIG. 2 is a front view of a first embodiment of the operator key pad.

The microcomputer 24 also receives timing signals from an oscillator 48 and operating data from an operator key pad 50. The timing signals are used to control the timing of the operations executed by the microcomputer 24 and may also be used to generate real-time data displayed on a real-time clock, such as a clock display 64 shown in FIG. 4. The key pad 50 in its simplest form consists of a system check push button switch 52 and an oil change reset button switch 54 as shown in FIG. 2. The system check switch 52 activates the microcomputer 24 to output to an in-vehicle display 60 both the percent of oil life remaining and the status of the oil. The reset push button switch 54 is activated when the oil is changed to re-initialize the microcomputer 24 and the data stored in its nonvolatile memory 62.

Figure 3:
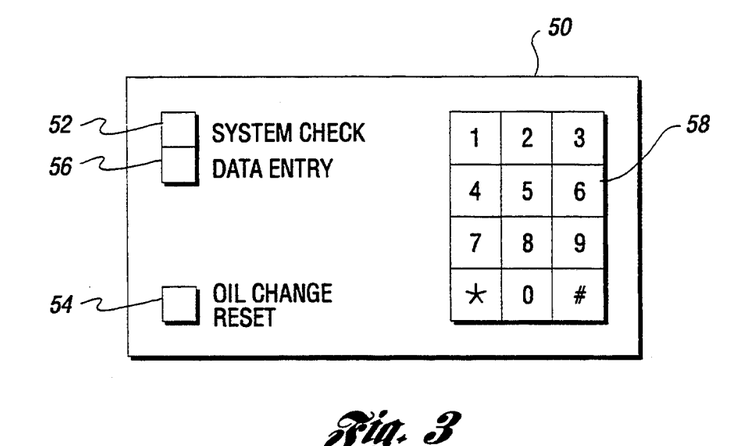
FIG. 3 is a front view of an alternate embodiment of the operator key pad.

Alternatively, the key pad 50 may also include a data entry button 56 and a set of conventional numerical keys 58 similar to the numerical keys provided on a telephone or hand calculator. The data entry button and numerical key 58 may be used by the operator to change selected parameters which would cause the oil change intervals to be different from the manufacturer recommended oil change intervals to suit the particular operating conditions of the vehicle or to enter the type of fuel being used in a multi-fuel engine as shall be explained hereinafter.

In the preferred embodiment, the in-vehicle display will sequentially display the percent of oil life remaining, the status of the oil, i.e. "OK", "CHANGE OIL SOON" or "OIL CHANGE REQUIRED" or any fault detected.

Figure 4:
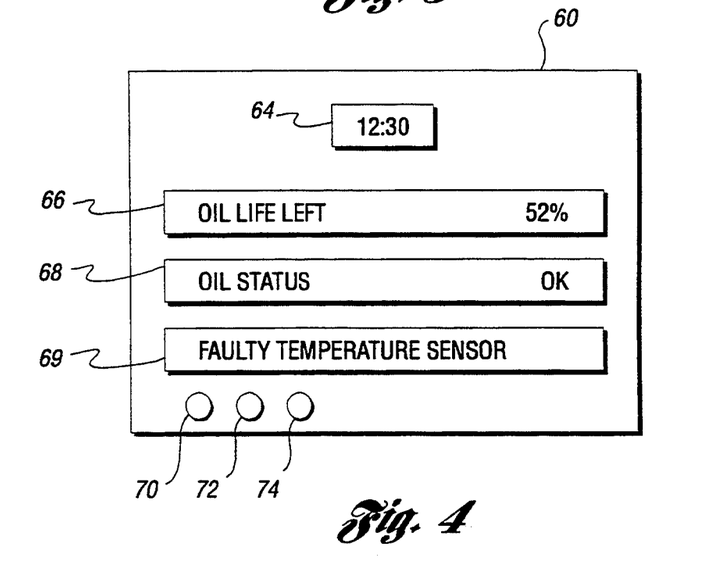
FIG. 4 is a front view of the in-vehicle display.

An alternate format of the in-vehicle display is shown in FIG. 4. The alternate format of the in-vehicle display 60 may, but not necessarily, have a real-time entry 64 giving the real-time of day, an oil life remaining entry 66 giving a percentage indicative of useful oil life still remaining, and an oil status entry 68 which are simultaneously displayed in contrast to the sequential display of the preferred embodiment. The oil status entry will display the word "OK" when the oil life remaining being displayed is greater than 5%, will display the phrase "CHANGE OIL SOON" when the percentage of oil life remaining is less than 5% but greater than 0%, and will display "OIL CHANGE REQUIRED" when the displayed percentage of oil life remaining is equal to 0%. The in-vehicle display preferably will also have a fault entry 69 which displays a fault condition when a fault, such as a faulty sensor, is detected. The in-vehicle display 60 may additionally be augmented by a green light 70 when "OK" is displayed by a yellow light 72 when the "CHANGE OIL SOON" is displayed and by a red light 74 when the "OIL CHANGE REQUIRED" is displayed. A sound generator 76, shown in phantom, may be activated by the microcomputer 24 to generate a momentary distinctive audible sound to alert the vehicle operator to the "CHANGE OIL SOON" and "OIL CHANGE REQUIRED" state existing. The green, yellow and red lights may be activated in response to the ignition switch being turned to the run position independent of the system check button being activated or may only be activated when the system check button is activated.

The system for determining oil change intervals will be explained with reference to the flow diagrams shown in FIGS. 5 through 17. The microcomputer 24 will be turned on whenever the vehicle's ignition switch 44 is turned to the "run" or "on" position. After executing a self-checking routine, the microcomputer 24 will execute the ignition On routine 78 presented in the flow diagram shown in FIG. 5a. The Ignition On routine 78 will begin by initializing selected parameters and counters, as indicated by block 80. After initialization, the Ignition On routine will proceed to inquire if an execute timer has timed out, decision block 82. The execute timer controls the rate at which the various tasks are executed by the system. In the preferred embodiment, these tasks are executed at 100 millisecond intervals. If the execution timer has not timed out, the routine will inquire decision block 130, FIG. 5b, if the ignition switch has been turned to the "off" position. As long as the ignition switch remains in the "on" or "run" position, the routine will recycle through decision blocks 80 and 130 until the execution timer times out. After the execution timer times out, the routine will inquire decision block 84 if an oil time timer has timed out. The oil time timer is set to time out at a real-time period of 12 hours, as indicated, or any other selected time interval. An increment time oil life pre-counter is incremented at block 86 each time the oil time timer times out. A percent time oil life stored by the microcomputer 24 is decremented by a predetermined percent, such as 2%, block 90, each time the time oil life pre-counter is incremented to a fixed number "T", as indicated by decision block 88.

Figure 6:
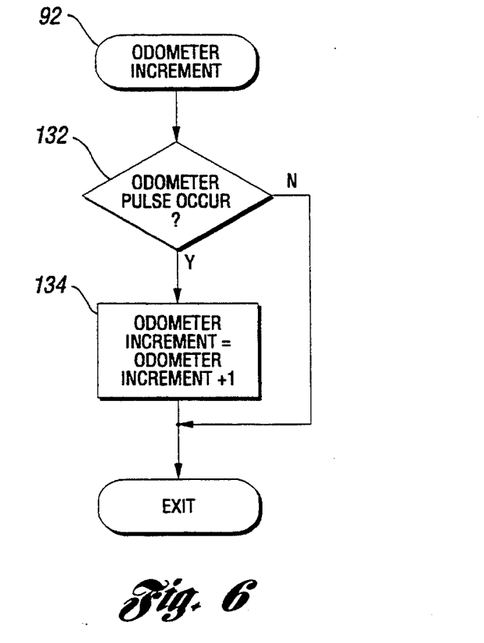
FIG. 6 is a flow diagram of the Odometer Increment subroutine.
Figure 7:
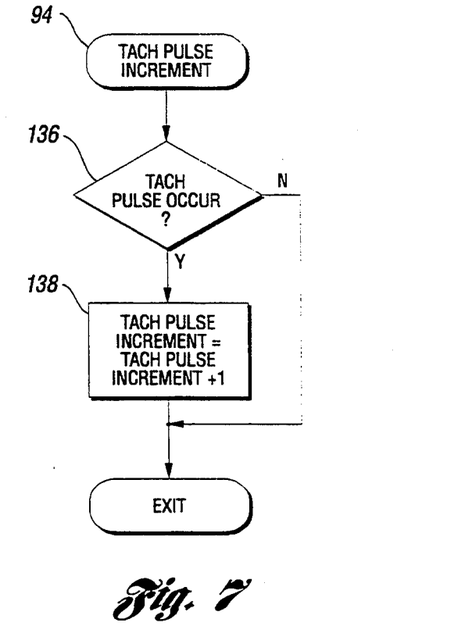
FIG. 7 is a flow diagram of the Tachometer Pulse Increment subroutine.

After decrementing the percent time oil life, block 90, or the time oil life pre-counter has not been incremented to T, decision block 88, the routine will proceed to sequentially execute the Odometer Increment routine 92 and Tachometer Pulse Increment subroutine 94. The Odometer Increment subroutine 92, as shown in FIG. 6, increments an odometer increment counter, block 134, each time an odometer pulse is generated by the odometer sensor 28 indicative of the vehicle having been driven a predetermined distance, decision block 132. In the preferred embodiment, the odometer sensor 24 generates 8,000 odometer pulses per mile. In a like manner, the Tachometer Pulse Increment subroutine 94, shown in FIG. 7, increments a tachometer pulse increment counter, block 138, for each tachometer pulse increment received from the electronic engine control 30, decision block 136. For example, a two cycle, four cylinder engine will generate four tachometer pulse increments for every two revolutions of the engine's crankshaft. Effectively, the content of tachometer pulse increment counter is a number corresponding to the number of engine revolutions.

Figure 5A:
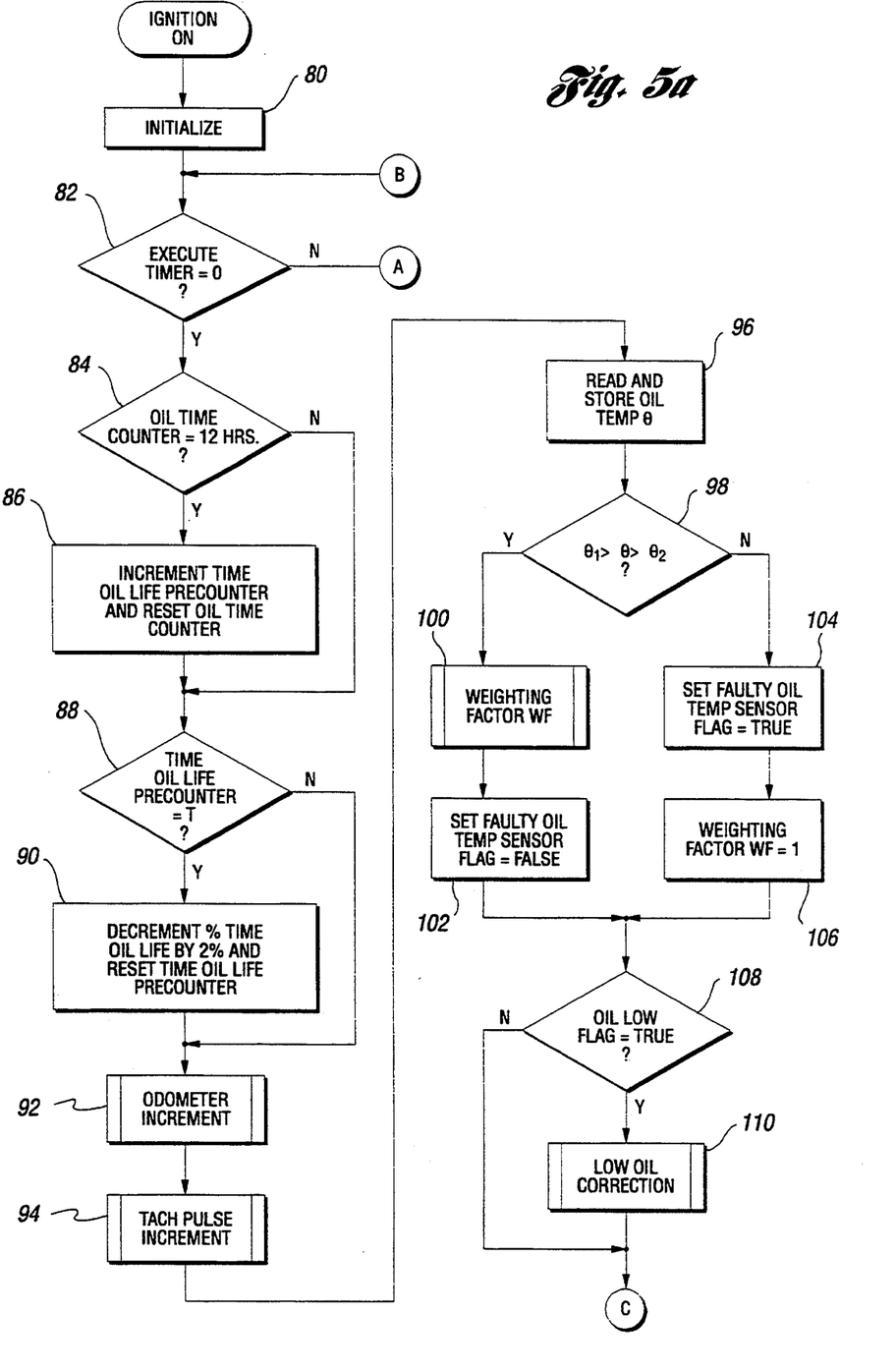
FIGS. 5a and 5b are a flow diagram of the Ignition on routine.

The Ignition On routine 78 will proceed to read and store the temperature 74 of the oil in the oil sump 12, block 96, and then inquire decision block 98 if the measured temperature $\theta$ is within a predetermined temperature range defined by $\theta_1$ and $\theta_2$. The temperatures $\theta_1$ and $\theta_2$ are selected to define a normal operating temperature range of the oil temperature such that a temperature outside this range could only be generated by a faulty temperature sensor 16. For example, the values of $\theta_1$ and $\theta_2$ may correspond to signals generated by the temperature sensor 16 when the thermistor is either shorted or open, respectively.

When the measured temperature $\theta$ is within the desired range, the routine will execute the "Weighting Factor WF" subroutine 100 then set a Faulty Oil Temperature Sensor flag to false, block 102. Otherwise, the routine will set the Faulty Oil Temperature Sensor flag to true, signifying a faulty temperature sensor, block 104, and set the weighting factor WF to one (1) as indicated by block 106.

Figures 8, 9, 10:
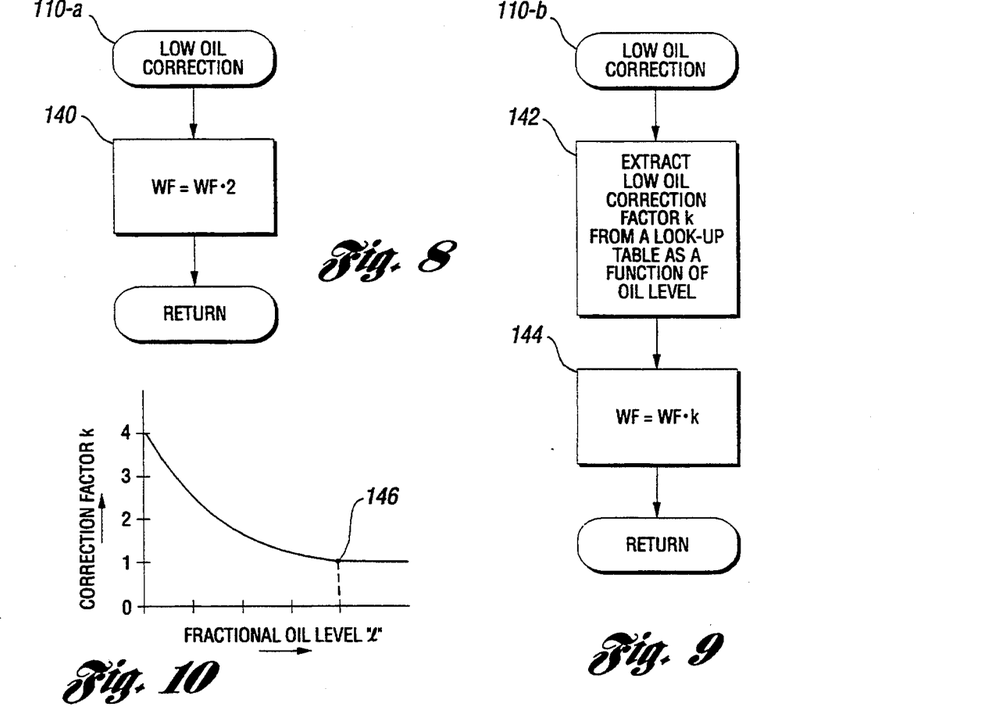
FIG. 8 is a flow diagram of the Low Oil Correction subroutine.
FIG. 9 is a flow diagram of an alternate embodiment of the Low Oil Correction subroutine.
FIG. 10 is a graph showing the variation of the correction factor k as a function of oil level.

The routine 78 will proceed to inquire, decision block 108, if the oil low flag is true. The oil level in the engine is measured periodically after the ignition switch has been turned to the "off" position and the engine has stopped. An Oil Low flag will be set to true if the engine oil level is below a predetermined level when the engine is not running as shall be described with reference to the Ignition Off subroutine 204, shown in FIG. 13. When the Oil Low flag is true, the routine will execute one of the Oil Low Correction subroutines 110a or 110b as shown in FIGS. 8 and 9, respectively. Referring to FIG. 8, the Low Oil Correction subroutine 110a may simply multiply the weighting factor wf by two (2), block 140. However, when the oil level sensor generates an analog signal having a fractional oil level value "l" corresponding to the oil level, the Low Oil Correction subroutine 110b may extract a correction factor k from a look-up table storing the correction factor k as a function of the fractional oil level value "l", block 142, then multiply the weighting factor WF by the extracted correction factor k, block 144. FIG. 10 is a graph showing the variation of the correction factor k as a function of fractional oil level value "l". The oil level indicated by point 146 indicates the lowest oil level for which no correction is required.

After the execution of the Low Oil Correction subroutine 110a or 110b, the Ignition On routine proceeds to correct the tachometer pulse increment by the corrected weighting factor WF, block 112. The Ignition On routine then inquires, decision block 114, if the weighted tachometer pulse increment is greater than a predetermined value, $N_{TP}$. When the weighted tachometer pulse increment is equal to or exceeds $N_{TP}$, the routine will proceed, block 116, to decrement the remaining percent tachometer oil life, then reset the tachometer pulse increment counter, block 118. The remaining percent tachometer oil life is set at 100% during the initialization in response to the reset button being pushed. The percentage that the remaining percent tachometer oil life is decremented each time the content of the tachometer pulse increment counter is equal to $N_{TP}$ is normally 1 percent, but may be any other percentage entered by the operator via the key pad 50 to increase or decrease the tachometer oil life as desired. This change may be desirable to compensate driving conditions, such as driving in a desert, driving in Alaska during winter or pulling a trailer.

Figure 5B:
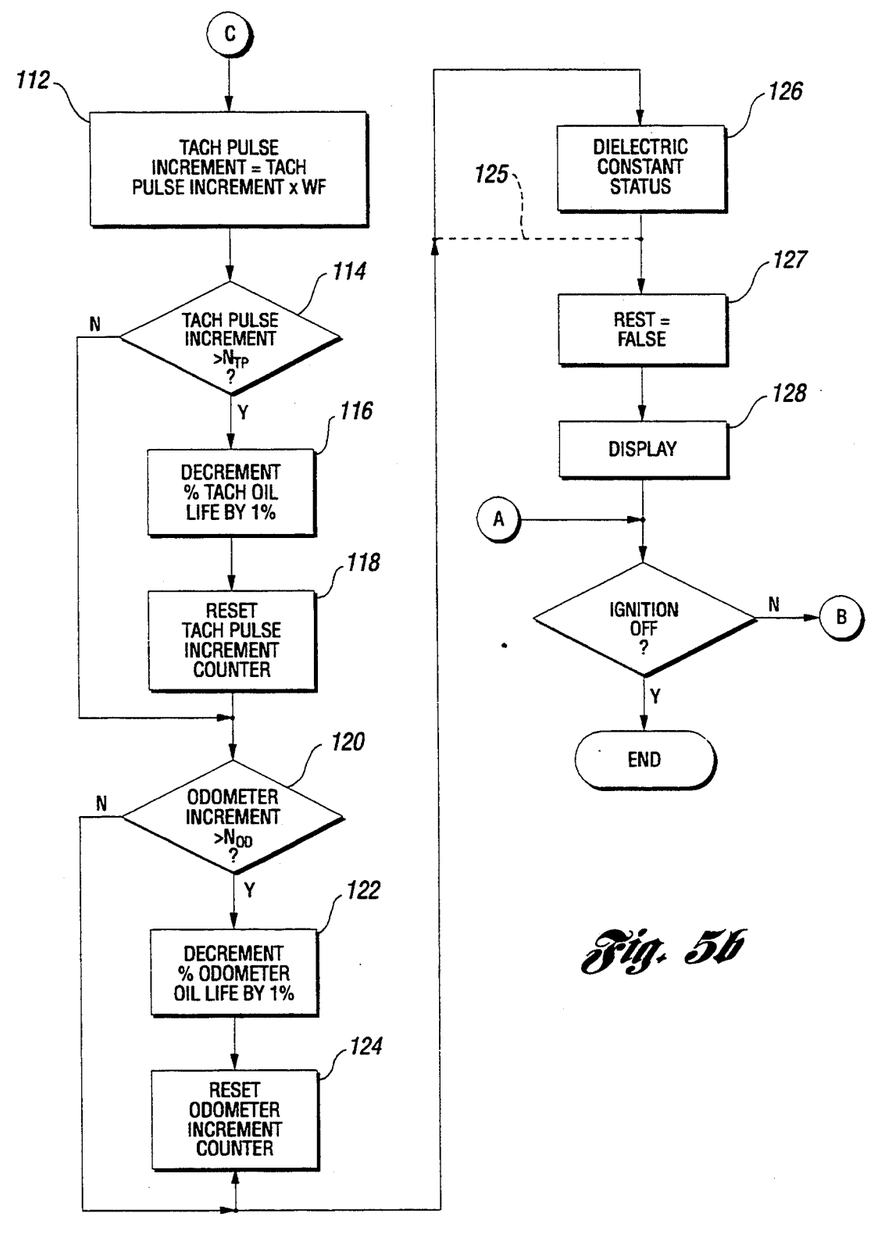

When the content of the tachometer pulse increment counter is less than $N_{TP}$, or the tachometer pulse increment counter has been reset, block 118, the Ignition On routine will inquire, decision block 120, if the odometer increment exceeds a value $N_{OD}$. When the odometer increment exceeds $N_{OD}$, the routine will proceed to decrement a remaining percent odometer oil life by a predetermined percentage, for example 1%. The remaining percent odometer is also set to be equal to 100% during initialization in response to the reset button 52 being pushed. However, the percentage that the remaining percent odometer oil life is decremented in response to the content of the odometer increment counter being equal to $N_{OD}$ may be changed by the operator of the vehicle via the key pad 50 to increase or decrease the odometer oil life as desired.

when the system for determining oil change intervals has an oil dielectric constant sensor, such as K, sensor 20 shown in FIG. 1, the Ignition On routine will proceed to execute the Dielectric Constant Status subroutine 126, otherwise, if the system does not include an oil dielectric constant sensor, the routine will proceed to set the reset flag to false, block 127, then execute the Display subroutine 128 as indicated by the dashed line 125.

Figure 11:
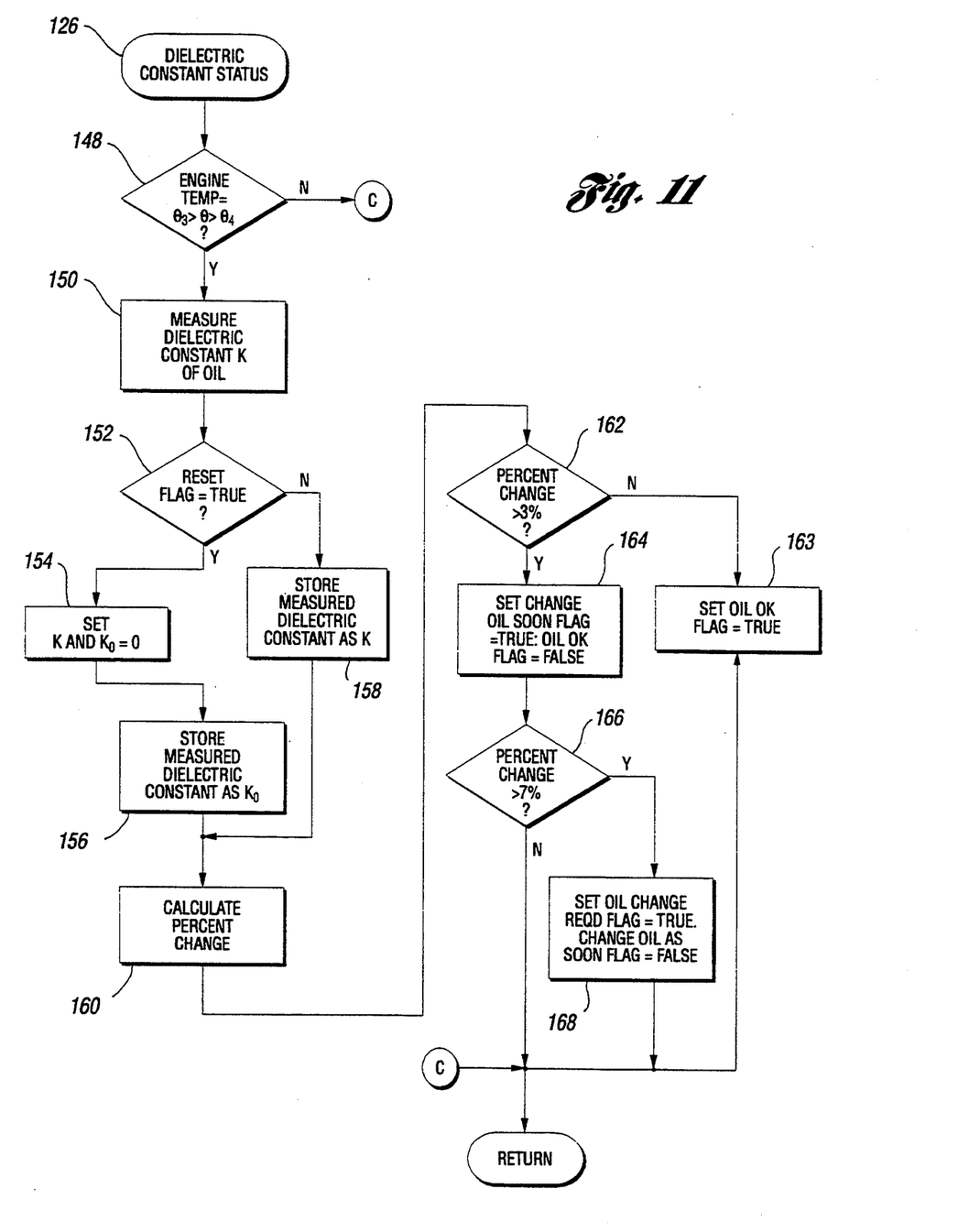
FIG. 11 is a flow diagram of the Dielectric Constant Status subroutine.

The Dielectric Constant Status subroutine 126 is illustrated by the flow diagram shown in FIG. 11. The Dielectric Constant Status subroutine 126 begins by inquiring, decision block 148, if the oil temperature 126 $\theta$ is between predetermined temperature limits $\theta_3$ and $\theta_4$. In the preferred embodiment, $\theta_3$ is equal to 90° C. and $\theta_4$ is 94° C., but $\theta_3$ and $\theta_4$ may be any other temperatures within the normal operating temperature range of the engine's oil. If the oil temperature $\theta$ is not between $\theta_3$ and $\theta_4$, the subroutine will return to the Engine On routine. However, when the oil temperature is between the limits $\theta_3$ and $\theta_4$, the subroutine will activate the dielectric constant sensor 20 to measure the dielectric constant of the oil, block 150, then proceed to inquire decision block 152 if the reset flag has been set to true, which indicates that this is the first time the dielectric constant has been measured since the oil was changed.

When the reset flag is true in response to pressing the oil change reset button 54, the subroutine will proceed to set the stored value of the dielectric constant K and the initial value of the dielectric constant $K_0$ to zero (0), block 154, then store the measured dielectric constant K as the initial dielectric constant $K_0$, block 156. If the reset flag is false, the measured dielectric constant is stored as the current dielectric constant K. The Dielectric Constant Status subroutine will then proceed to calculate, block 160, the percent change in the dielectric constant of the oil where:

$$\text{Percent Change} = \frac{(K - K_0) \times 100}{K_0}$$

After calculating the percent change, the subroutine inquires, decision block 162, if the percent change is greater than 3 percent (3%). If the percent change is less than 3 percent, an oil OK flag is set true, block 163, then the subroutine will return to the Ignition On routine 78, otherwise, the routine will set a change oil soon flag to true, and set the oil OK flag false, block 164. The routine will then inquire, decision block 166, if the percent change is greater than 7 percent (7%). If the percent change is greater than 7%, the subroutine will set the oil change required flag to true and set the change oil soon flag to false, block 168. If the percent change is greater than 3% but less than 7%, the Dielectric Constant Status subroutine 126 will return to the Ignition On routine, leaving only the change oil soon flag set to true.

Figure 12:
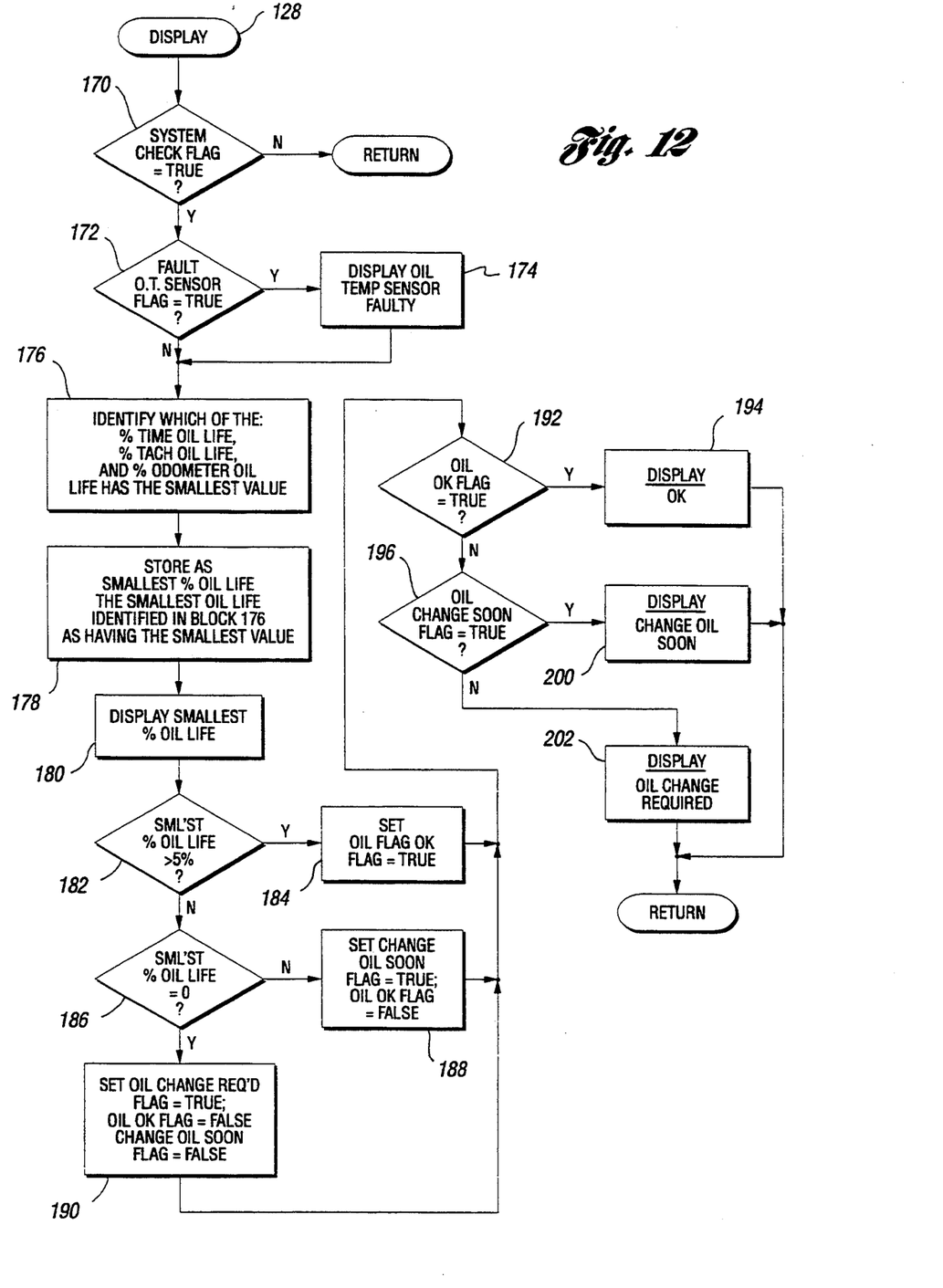
FIG. 12 is a flow diagram of the Display subroutine.

Returning to FIG. 5b, after resetting the odometer increment counter, block 124, or executing the Dielectric Constant Status subroutine 126 when the system includes a dielectric sensor, the Ignition On routine 78 will proceed to set the reset flag to false, block 127, then execute the Display subroutine 128, illustrated in the flow diagram shown in FIG. 12. The Display subroutine 128 begins by inquiring, decision block 170, if a system check flag is true indicating the system check button 52 on the key pad 50 has been actuated. The system check flag may remain true as long as the system check button 52 is pressed, or remain true for a selected period of time, for example 30 seconds, after the system check switch is released, then automatically return to false. When the system check flag is false, the Display subroutine will return to the Ignition On routine 78 since no display is requested. Alternatively, the Display subroutine will inquire, decision block 172, if the faulty oil temperature flag is true, signifying a faulty oil temperature sensor. When the faulty oil temperature sensor flag is true, the Display subroutine will activate the in-vehicle display 60 to display "FAULTY TEMPERATURE SENSOR," otherwise the subroutine will proceed to identify which of the remaining percent time oil life, i.e. remaining percent tachometer oil life or remaining percent odometer oil life, has the smallest value, box 176. The Display subroutine 128 will then store as the smallest remaining percent oil life, block 178, the remaining percent oil life identified in block 176 as having the smallest value. The Display subroutine will then proceed to display the percentage value of the smallest remaining percent oil life block 180.

After displaying the smaller remaining percent oil life, the subroutine will proceed to inquire, decision block 182, if the smallest remaining percent oil life is greater than 5 percent (5%). If this is so, the subroutine will proceed to set an oil OK flag to true, block 184, otherwise proceed to inquire, decision block 186, if the smallest remaining percent oil life is equal to zero (0). When the smallest remaining percent oil life is less than 5 percent but greater than zero, the subroutine will set the change oil soon flag to true and the oil OK flag to false, block 188. Alternatively, when the smallest remaining percent oil life is zero, the subroutine will set the oil change required flag to true and set the oil OK and change coil soon flags to false, block 190.

After one of the flags is set, the subroutine will inquire, decision block 192, if the oil OK flag is true? When true, the subroutine will display on the in-vehicle display 60, the letters OK, block 194. Alternatively, if the oil OK flag is false, the subroutine will inquire, decision block 196, if the change oil soon flag is true? If true, the subroutine will display the phrase "OIL CHANGE REQUIRED", block 202. The subroutine will return to the Ignition On routine after any one of "OK", "CHANGE OIL SOON" or "OIL CHANGE REQUIRED" are displayed on the in-vehicle display 60.

After executing the Display subroutine 128, the Ignition On routine will inquire, decision block 130, if the ignition switch has been placed in the "off" position. If the ignition switch is still in the "run" position, the Ignition On routine will jump back to decision block 82 and repeat, otherwise, if the ignition switch is in the off position, the Ignition On routine will terminate.

Figure 13:
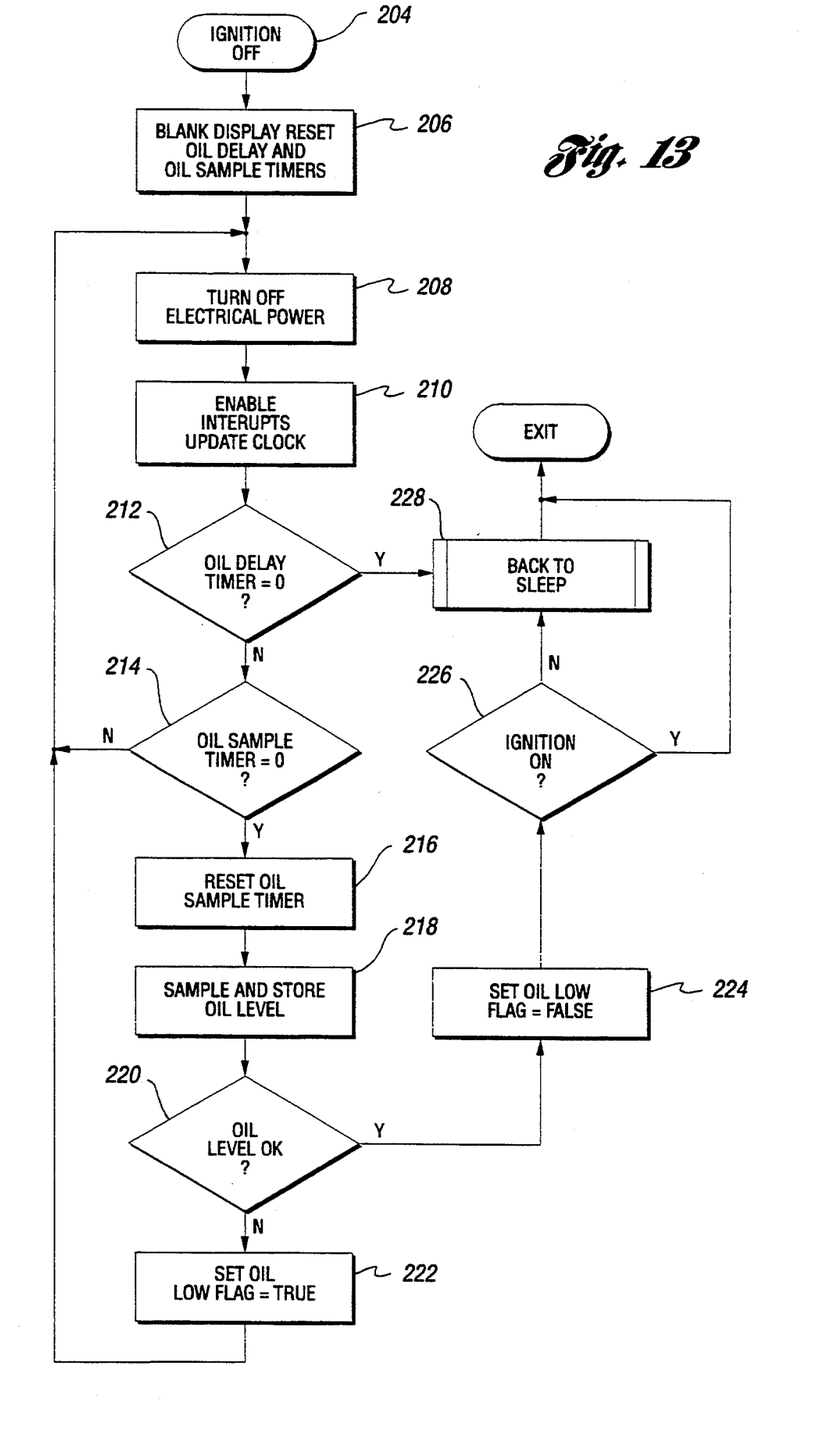
FIG. 13 is a flow diagram of the Ignition Off routine.

The turning of the ignition switch to the "off" position initiates the Ignition Off routine shown in FIG. 13. The Ignition Off routine 204 begins by blanking the display on the in-vehicle display 60 then resetting the oil delay and oil sample timers. The oil delay timer sets a fixed period of time in which the oil level in the engine is to be measured. In the preferred embodiment, the oil delay timer is selected to be approximately 11 minutes. The oil sample timer sets the timing at which the oil level is measured by the oil level sensor 18. As previously discussed, the oil level sensor 18 may be a simple single pole, single throw switch or a potentiometer-type device generating an oil level signal having a value which is a function of the oil level.

The Ignition Off routine will then proceed to turn off the electrical power to selected devices, such as the oil temperature sensor 16 and the dielectric constant sensor 20, block 208. After turning off the electric power to selected devices, the routine will enable interrupts and update the real-time clock, block 210, then inquire, decision block 212, if the oil delay timer has timed out. If the oil delay timer has not timed out, the routine will inquire, decision block 214, if the sample timer has timed out. Alternatively, the routine will execute the Back-to-Sleep subroutine 228. When the oil sample timer times out, the routine will reset the sample timer, block 216, then activate the oil level sensor 18, sample and store the oil level, block 218. Otherwise, the Ignition Off routine will jump back to block 208.

After sampling and storing the oil level, the routine will inquire, decision block 220, if the oil level is OK, indicating the oil level is within the limits specified by the manufacturer. If not, the routine will set an oil low flag to true, block 222, and return to block 208. This cycle will repeat until either the oil delay timer times out, decision block 212, or the oil level is OK, decision block 220. Once the oil level returns to an OK level, the routine will set the oil low flag to false, then inquire, decision block 226, if the ignition switch has been turned to the on or run position. When the ignition switch is in the on or run position, the Ignition Off routine will exit, otherwise, proceed to exercise the Back-to-Sleep subroutine 228.

Figure 14:
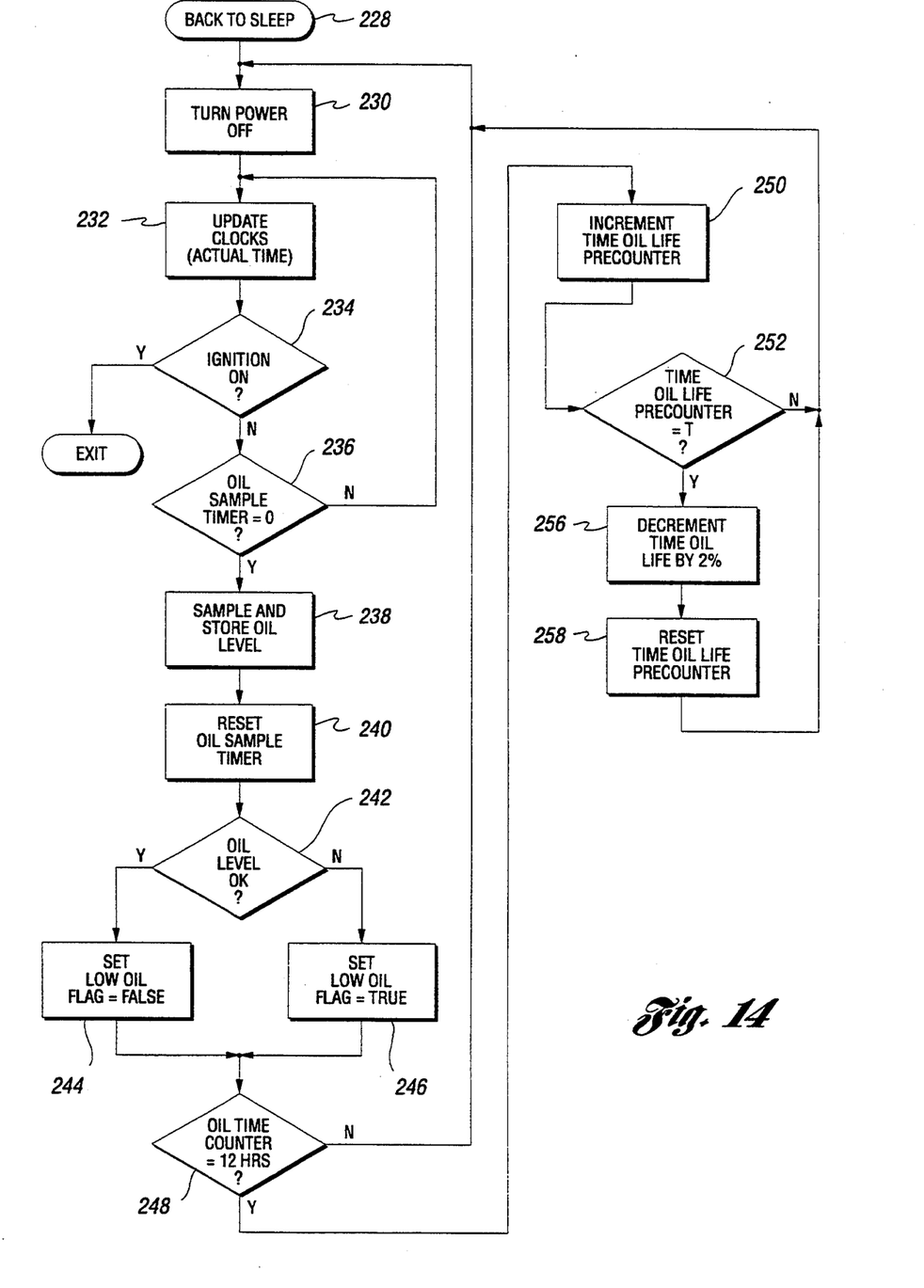
FIG. 14 is a flow diagram of the Back-to-Sleep subroutine.

The details of the Back-to-Sleep subroutine 228 begins by turning the power off, block 230, then proceeds to update the clock, block 232. After updating the clock, the Back-to-Sleep subroutine 228 inquires decision block 234 if the ignition switch is in the on position. If the ignition switch is in the on position, the Back-to-Sleep subroutine is terminated and exits, otherwise the subroutine inquires, decision block 234, if the oil sample timer has expired. If the oil sample timer has not expired, the routine jumps back to block 232 and recycles until the oil sample timer expires. After it expires, the subroutine will turn on the electrical power and sample and store the oil level, block 238, then reset the oil sample timer, block 240. The subroutine will then inquire, decision block 242, if the oil level is OK, indicating the oil level is within the levels specified by the engine manufacturer. If so, the low oil flag is set false, otherwise the low oil flag is set true.

After setting the low oil flag, the subroutine will inquire, decision block 248, if the oil time counter = 12 hours. If the oil time counter reaches 12 hours, the oil time precounter is incremented, block 250. Otherwise, the Back-to-Sleep subroutine jumps back to block 230 and turns the power off.

After incrementing the oil time precounter, the subroutine inquires, decision block 252, if the content of the oil time precounter is equal to a predetermined number T. If not, the subroutine jumps back to block 230. Alternatively, the subroutine will decrement the oil life time by 2% as indicated in block 256, then reset the oil timer precounter, block 258. After resetting the oil time precounter, the Back-to-Sleep subroutine will jump back to block 230 and continue to recycle until the ignition switch is turned to the on position.

The Ignition Off routine 204, including the Back-to-Sleep subroutine 228, continues to monitor the oil level in the engine and continues to update real-time clock, the oil time counter and the increment oil time precounter and will decrement the remaining time oil life during the period when the ignition is in the off position. The sample time timer preferably will sample the oil level at shorter intervals during the period of time set by the oil delay timer. During this first period, the oil level is sampled at 18 second intervals for the period of time set by the oil delay timer, then sample the oil level once a minute thereafter. This gives the oil distributed through the engine when it is running time to return to the oil sump 14 after the engine is stopped and prevents the low oil flag from remaining true after the oil distributed throughout the engine returns to the oil sump and the oil level returns to a level greater than the minimum level.

Figures 15, 16:
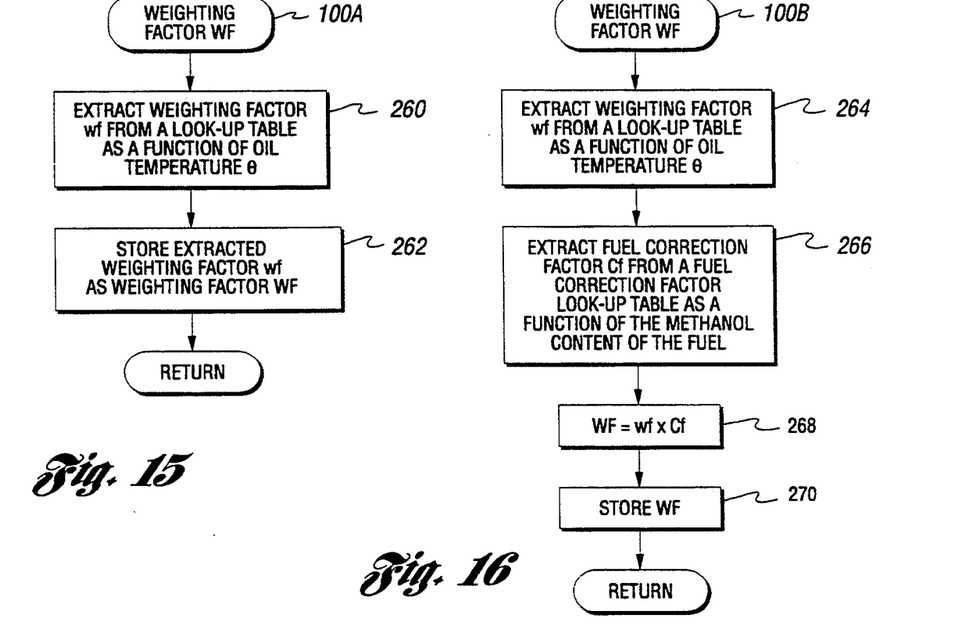
FIG. 15 is a flow diagram of a first embodiment of the Weighting Factor wf subroutine.
FIG. 16 is a flow diagram of a second embodiment of the Weighting Factor wf subroutine.

The Weighting Factor subroutine 100 executed during the Ignition On routine 78, shown in FIG. 5a, may be relatively simple, as shown in FIG. 15, when the fuel used to power the engine is pure gasoline or gasoline having a low alcohol or methanol content. In the Weighting Factor subroutine 100A, shown in FIG. 15, a weighting factor, wf, is extracted from a look-up table storing weighting factors as a function of oil temperature, block 260, then the extracted weighting factor, wf, is stored as weighting factor WF.

Vehicles equipped to run on alcohol methanol/gasoline blends up to 85% alcohol or 85% methanol have been found to require oil change intervals which are different from the oil change intervals for pure gasolinepowered engines to adequately protect the engine. Currently, flexible fuel electronic engine controls are being developed which employ a fuel sensor 290 (FIG. 1) which measures the alcohol or methanol content of the fuel. The fuel sensor 290 provides an input to the on-board flexible fuel electronic engine control, which corresponds to electronic engine control 30, shown in FIG. 1. The flexible fuel electronic engine control then is capable of computing the air/fuel mixture required for the proper operation of the engine.

The Weighting Factor subroutine 100B, shown in FIG. 16, is responsive to both the engine oil temperature and the alcohol or methanol content of the fuel to generate a weighting factor WF. The Weighing Factor subroutine 100B first extracts a weighting factor wf from a look-up table storing weighting factors as a function of oil temperature, block 264. The subroutine then extracts a fuel correction factor $C_f$ from fuel correction look-up table storing fuel correction factors $C_f$ as a function of the methanol content of the fuel in response to the methanol content of the fuel detected by the fuel sensor block 266. The weighting factor wf is then set equal to the extracted weighting factor wf times the extracted fuel correction factor $C_f$ i.e. wf=wf×$C_f$, block 268. The product of wf×$C_f$ is subsequently stored as weighting factor WF for use by the Ignition On routine 78, block 270.

Alternately, when the engine does not have a fuel sensor such as fuel sensor 290 detecting the alcohol or methanol content of the fuel, the alcohol or methanol content of the fuel, when known, may be entered into the microcomputer by the operator via the operator key pad 50. In the Weighting Factor subroutine 100C, shown in FIG. 17, the operator may enter one of four alcohol or methanol/gasoline mixture ranges M0, M25, M50 and M85, whichever is closest to the alcohol or methanol/gasoline blend currently fueling the engine. M0 is equivalent to pure gasoline, M25 represents a 25%/75% alcohol or methanol/gasoline blend, M50 represents a 50%/50% alcohol or methanol/gasoline blend, and M85 represents an 85%/15% alcohol or methanol/gasoline blend.

Figure 17:
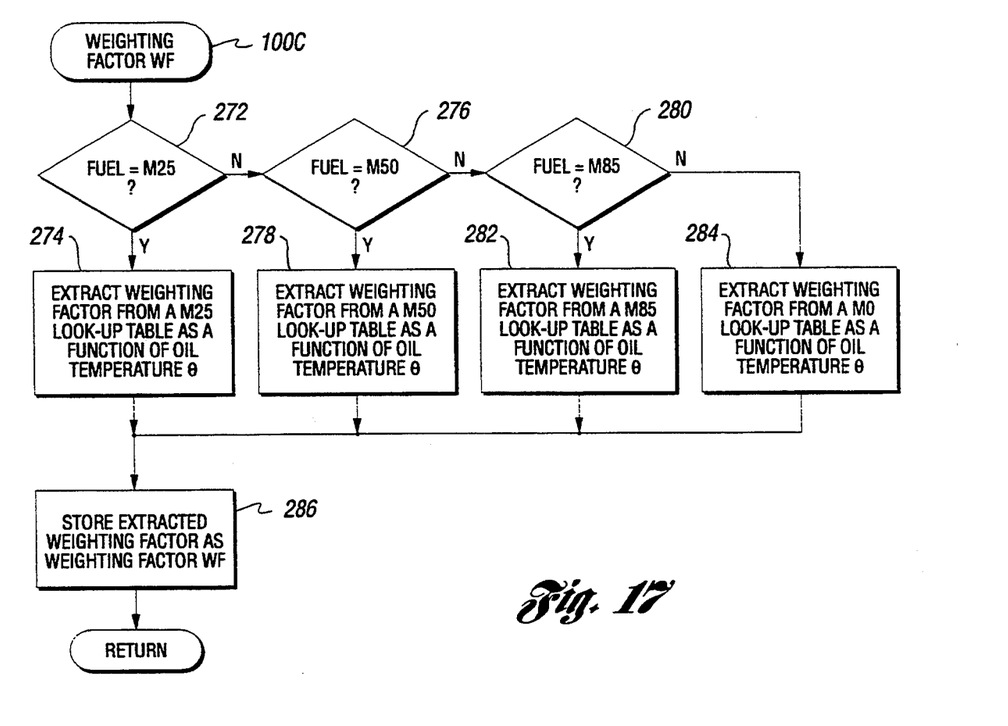
FIG. 17 is a flow diagram of a third embodiment of the Weighting Factor wf subroutine.

The Weighting Factor WF subroutine 100C begins by inquiring, decision block 272, if the 25%/75% alcohol or methanol/gasoline blend, M25, was entered by the operator. If true, the subroutine will extract a weighting factor wf from a M25 look-up table as a function of oil temperature $\theta$. Otherwise, the subroutine will inquire, decision block 276, if the 50%/50% alcohol or methanol/gasoline blend, M50, was entered. If true, the subroutine will extract a weighting factor wf from a M50 look-up table as a function of oil temperature $\theta$, block 278. If the entered alcohol or methanol/gasoline blend is not M50, the subroutine will inquire if the 85%/15% alcohol or methanol/gasoline blend, M85, was entered. If M85 was entered, the subroutine will extract the weighting factor wf from an M85 look-up table as a function of engine temperature, block 282. If M85 was not entered, then the weighting factor wf will be extracted from a M0 look-up table as a function of oil temperature, block 284. The weighting factor in the look-up tables will differ if the blends are alcohol/gasoline blends or methanol/gasoline blends.

After a weighting factor has been extracted, the extracted weighting factor wf is stored as a weighting factor WF, block 286, then returns to the Ignition On routine 78.

It is to be recognized that the methanol/gasoline blend entered by the operator may be use to extract the fuel correction factor $C_f$ in the Weighting Factor wf subroutine 100B and that the methanol/gasoline blend sensed by the fuel sensor may alternately be used in place of the entered methanol/gasoline blend in Weighting Factor wf subroutine 100C, shown in FIG. 17.

Having described the system for determining oil change intervals with reference to the drawing, it is recognized that others skilled in the art may make changes or improvements within the scope of the appended claims.

We claim:

1. An oil monitoring system for an internal combustion engine mounted in a vehicle, said engine having a rotary output member and an oil sump storing oil for lubricating said engine, said system comprising:

means for generating tachometer pulse increments corresponding to the rotation of said rotary output member, said tachometer pulse increments being proportional to the number of revolutions of said rotary output member;

means for generating a weighting factor as a function of the temperature of said oil in said oil sump;

an oil sensor for generating an oil level signal having a value indicative of the level of said oil in said oil sump;

means for multiplying said weighting factor by a predetermined quantity in response to said oil level signal having a value signifying the level of said oil in said oil sump is below a predetermined level to generate a corrected weight factor;

means for multiplying said tachometer pulse increments by said corrected weighting factor to generate a weighted tachometer pulse increment;

means for storing a remaining percent tachometer oil life indicative of the remaining number of revolutions of said rotary output member before said oil is to be changed;

means for detecting the generation of a predetermined number of weighted tachometer pulse increments to decrement said remaining percent tachometer oil life by a first preselected percentage;

means for storing a remaining percent time oil life indicative of the actual time remaining before said oil is to be changed;

means for detecting the passing of a predetermined time interval to decrement said remaining percent time oil life by a second preselected percentage;

means for storing a remaining percent odometer oil life indicative of the number of miles remaining to be driven by said vehicle before said oil is to be changed;

means for detecting each time said vehicle has been driven a predetermined distance to decrement said remaining percent odometer oil life by a third preselected percentage;

means for selecting the smallest of said remaining percent tachometer oil life, said remaining percent time oil life and said remaining percent odometer oil life to generate a smallest remaining percent oil life;

an in-vehicle display for generating a visual display;

first means for activating said in-vehicle display to display said smallest remaining percent oil life;

second means for activating said in-vehicle display to display a first message indicating that an oil change is not required in response to said smallest remaining percent oil life being greater than a predetermined percent;

third means for activating said in-vehicle display to display a second message indicating that the oil is to be changed in the near future in response to said smallest remaining percent oil life being greater than zero and less than said predetermined percent; and fourth means for activating said in-vehicle display to display a third message indicating its time to change the oil now in response to said smallest remaining percent oil life time being decremented to zero.

2. The system of claim 1 including means for changing said first preselected percentage at which said remaining percent tachometer oil life is decremented to change the duration of said tachometer oil life, for changing said second preselected percentage at which said remaining percent time oil life is decremented to change the duration of said time oil life, and for changing said third preselected percentage at which said remaining percent odometer oil life is decremented to change the duration of said odometer oil life.

3. The system of claim 2 wherein said means for changing is a key pad mounted in said vehicle, said key pad having at least said system check switch, said reset switch and a set of numerical keys for entering the values to which said first, second and third preselected percentages are to be changed.

4. The oil monitoring system of claim 1 further comprising a reset switch actuable from an off state to an on state to signify the oil in said engine has been changed, said on state resetting said remaining percent tachometer oil life, said remaining percent time oil life and remaining percent odometer oil life to 100%.

5. The system of claim 4 further having a system check switch disposed in said vehicle, said system check switch having an "off" state disabling said first, second, third and fourth means for activating said in-vehicle display and an "on" state for enabling said first, second, third and fourth means for activating said in-vehicle display.

6. The system of claim 5 wherein said system includes means responsive to said "on" state of said system check switch for enabling said first, second, third and forth means for activating said in-vehicle display for a preselected time after said system check switch is placed in said "off" state.

7. The system of claim 1 wherein said engine includes a distributor and an electronic engine control generating ignition pulses transmitted to said distributor, said means for generating tachometer pulse increments generates said tachometer pulse increments in response to said ignition pulses.

8. The system of claim 7 wherein said means for generating a weighting factor comprises:

an oil temperature sensor generating an oil temperature signal having a value corresponding to the temperature of said oil in said oil sump;

a look-up table storing weighting factors as a function of said oil temperature; and means for extracting a weighting factor from said look-up table in response to said value of said oil temperature signal.

9. The system of claim 8 wherein said means for multiplying said weighting factor by a predetermined quantity comprises:

means responsive to said value of said oil level signal for generating a correction factor indicative of said predetermined quantity; and means for multiplying said weighting factor by said correction factor to generate said corrected weighting factor.

10. The system of claim 1 wherein said means for detecting the passing of a predetermined time interval comprises:

a clock generating clock signals at predetermined intervals;

an oil time counter for counting said clock signals;

a time oil life precounter;

means for incrementing the content of said time oil life precounter each time said oil time counter counts a preselected number of clock signals; and means for decrementing said remaining percent time oil life by said second predetermined percent each time said time oil life precounter is incremented to a predetermined number.

11. The system of claim 1 wherein said means for detecting each time said vehicle has been driven a predetermined distance comprises:

an odometer sensor generating an odometer pulse each time the vehicle is driven a selected distance;

an odometer counter for counting said odometer pulses;

an odometer increment counter having a content corresponding to a distance driven by said vehicle;

means for incrementing said content of said odometer increment counter each time said odometer counter counts a predetermined number of odometer pulses; and means for decrementing said remaining percent odometer oil life said third predetermined percent each time said odometer increment counter is incremented to a number corresponding to said predetermined distance.

12. The system of claim 1 wherein said vehicle includes an ignition switching having a "run" position enabling said engine to operate and an "off" position terminating the operation of said engine, said means for multiplying said weighting factor in response to said valve of said oil level signal when said ignition switch was in said "off" position prior to being turned to said "run" position.

13. The system of claim 12 wherein said oil sensor generates and stores said level of said oil at preselected intervals in response to said ignition switch being placed in said "off" position.

14. An oil monitoring system for an internal combustion engine mounted in a vehicle, said engine having a rotary output member and an oil sump storing oil for lubricating said engine, said system comprising;

means for generating tachometer pulse increments corresponding to the rotation of said rotary output member, said tachometer pulse increments being proportional to the number of revolutions of said rotary output member;

means for generating a weighting factor as a function of the temperature of said oil in said oil sump;

an oil sensor for generating an oil level signal having a value indicative of the level of said oil in said oil sump;

means for multiplying said weighting factor by a predetermined quantity in response to said oil level signal having a value signifying the level of said oil in said oil sump is below a predetermined level to generate a corrected weight factor;

means for multiplying said tachometer pulse increments by said corrected weighting factor to generate a weighted tachometer pulse increment;

means for storing a remaining percent tachometer oil life indicative of the remaining number of revolutions of said rotary output member before said oil is to be changed;

means for detecting the generation of a predetermined number of weighted tachometer pulse increments to decrement said remaining percent tachometer oil life by a first preselected percentage;

means for storing a remaining percent time oil life indicative of the actual time remaining before said oil is to be changed;

means for detecting the passing of a predetermined time interval to decrement said remaining percent time oil life by a second preselected percentage;

means for storing a remaining percent odometer oil life indicative of the number of miles remaining to be driven by said vehicle before said oil is to be changed;

means for detecting each time said vehicle has been driven a predetermined distance to decrement said remaining percent odometer oil life by a third preselected percentage;

means for selecting the smallest of said remaining percent tachometer oil life, said remaining percent time oil life and said remaining percent odometer oil life to generate a smallest remaining percent oil life;

an in-vehicle display for generating a visualdisplay; and first means for activating said in-vehicle display in response to said smallest remaining percent oil life time being decremented to zero to display a first message signifying it is time to change the oil.

15. The system of claim 14 wherein said engine is adapted to run on at least two different fuels and wherein the rate at which said oil is degraded using one of said at least two different fuels is different from the rate at which said oil is degraded using the other of said at least two different fuels, said means for generating a weighting factor comprises:

means for generating a fuel signal identifying which fuel of said at least two different fuels is currently being used in said engine; and fuel type responsive means for generating said weighting factor as a function of oil temperature and said fuel signal.

16. The system of claim 15 wherein said engine has a fuel delivery system, said means for generating a fuel signal is a fuel sensor disposed in said fuel delivery system upstream of said engine, said fuel sensor generating a signal uniquely identifying each respective one of said at least two different fuels.

17. The system of claim 15 wherein said fuel type responsive means for generating a weighting factor comprises:

a look-up table associated with each of said at least two different fuels, each look-up table storing weighting factors associated with a respective one of the associated fuel as a function of oil temperature;

means for selecting from said look-up table associated with the fuel identified in said fuel signal; and means for extracting from said selected look-up table a weighting factor as a function of the temperature of said oil.

18. The system of claim 15 wherein said fuel type responsive means for generating a weighting factor comprises:

an oil temperature look-up table storing interim weighting factors as a function of oil temperature;

a multi-fuel look-up table storing correction factors as a function of said at least two fuels;

means for extracting from said oil temperature look-up table an interim weighting factor associated with said oil temperature;

means for extracting from said multi-fuel look-up table a correction factor associated with said fuel identified in said fuel signal; and means for multiplying said extracted interim weighting factor by said correction factor to produce said weighting factor.

19. The system of claim 15 wherein said means for generating a fuel signal is a key pad permitting a manual generation of said fuel signal by an operator of said vehicle.

20. The system of claim 14 further comprising second means for activating said in-vehicle display to display said smallest remaining percent oil life.

21. The system of claim 14 further comprising third means for activating said in-vehicle display in response to said smallest remaining percent oil life being greater than zero and less than a predetermined remaining percent of oil life to display a second message signifying that the oil should be changed soon.

22. The system of claim 21 further comprising fourth means for activating said in-vehicle display in response to said smallest remaining percent oil life being greater than said predetermined remaining percent of oil life to display a third message signifying that an oil change is not required at this time.

23. The system of claim 22 further comprising means for activating said in-vehicle display to display said smallest remaining percent oil life.

24. The system of claim 22 further comprising:

an oil dielectric constant sensor, responsive to said value of said temperature signal being within a selected temperature range, to generate a dielectric constant signal having a value indicative of the dielectric constant of said oil;

a reset switch actuable from an "off" state to an "on" state to signify the oil in said engine has been changed;

means responsive to said reset switch being in said "on" state for storing said value of said dielectric constant signal as an initial value of said dielectric constant of said oil;

means responsive to said reset switch being in said "off" state for storing said value of said dielectric constant as a current value of said dielectric constant;

means responsive to said initial value and said current value of said dielectric constant for calculating a percent change in said dielectric constant;

means responsive to said percent change of said dielectric constant being less than a first value for activating said in-vehicle display to display said third message;

means responsive to said percent change being between said first value and a second higher valve for activating said in-vehicle display to display said second message; and means responsive to said percent change being greater than said second value for activating said in-vehicle display to display said first message.

25. The system of claim 24 wherein said means for activating said display in response to said percent change being less than said first value comprises means responsive to said percent change being less than said first value to set an oil OK flag true, wherein said means for activating said display in response to said percent change between said first value and a second value comprises means responsive to said percent change being between said first value and said second value to set a change oil soon flag to true, and reset said oil OK flag to false, and wherein said means responsive to said percent change being greater than said second value comprising means responsive to said percent change being greater than said second value to set an oil change required flag to true and said change oil soon flag false, and wherein said means for activating said display to display said third message is further responsive to said oil OK flag being true to display said third message, said means for activating said in-vehicle display to display said second message is further responsive to said change oil soon flag being true to display said second message; and said means for activating said in-vehicle display to display said first message is further responsive to said oil change required flag being true to display said first message.

26. The system of claim 24 wherein said selected temperature range is the temperature range between 90° C and 94° C.

27. An oil monitoring system for an internal combustion engine mounted in a vehicle, said engine having a rotary output member and an oil sump storing oil for lubricating said engine, said system comprising:

means for generating tachometer pulse increments corresponding to the rotation of said rotary output member, said tachometer pulse increments being proportional to the number of revolutions of said rotary output member;

means for generating a weighting factor as a function of the temperature of said oil in said oil sump;

an oil sensor for generating an oil level signal having a value indicative of the level of said oil in said oil sump;

means for multiplying said weighting factor by a predetermined quantity in response to said oil level signal having a value signifying the level of said oil in said oil sump is below a predetermined level to generate a corrected weight factor;

means for multiplying said tachometer pulse increments by said corrected weighting factor to generate a weighted tachometer pulse increment;

means for storing a remaining percent tachometer oil life indicative of the remaining number of revolutions of said rotary output member before said oil is to be changed;

means for detecting the generation of a predetermined number of weighted tachometer pulse increments to decrement said remaining percent tachometer oil life by a first preselected percentage;

means for storing a remaining percent time oil life indicative of the actual time remaining before said oil is to be changed;

means for detecting the passing of a predetermined mime interval to decrement said remaining percent time oil life by a second preselected percentage;

means for storing a remaining percent odometer oil life indicative of the number of miles remaining to be driven by said vehicle before said oil is to be changed;

means for detecting each time said vehicle has been driven a predetermined distance to decrement said remaining percent odometer oil life by a third preselected percentage;

means for selecting the smallest of said remaining percent tachometer oil life, said remaining percent time oil life and said remaining percent odometer oil life to generate a smallest remaining percent oil life;

an in-vehicle display for generating a visual display;

means for activating said in-vehicle display to display said smallest remaining percent oil life; and a reset switch actuable from an "off" state to an "on" state to signify the oil in said engine has been changed, said reset switch in said "on" state resetting said remaining percent tachometer oil life, said remaining percent time oil life and said remaining percent odometer oil life to 100 percent.

* * * * *